Dec. 3, 1957 R. L. FRAZIER 2,814,900
ELECTRIC FISHING SIGNAL DEVICE BITE BUZZ LIGHT
Filed May 22, 1953
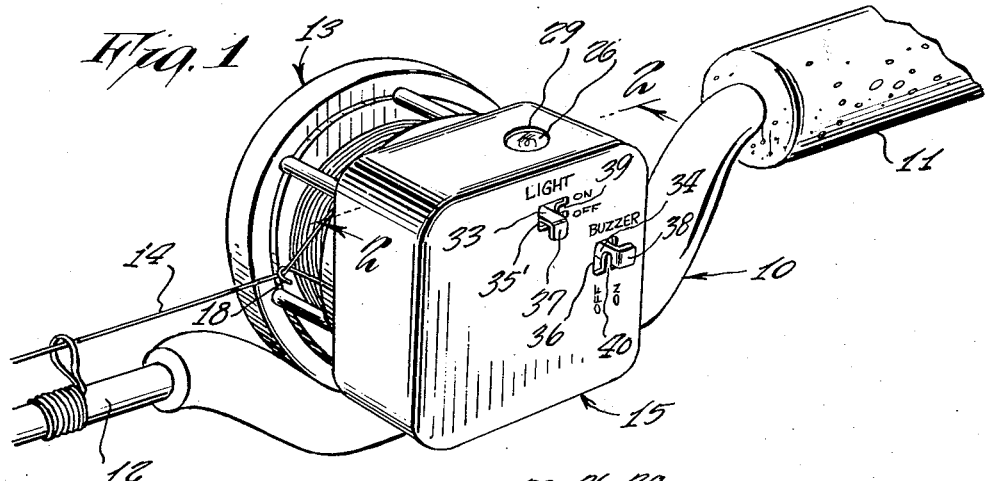
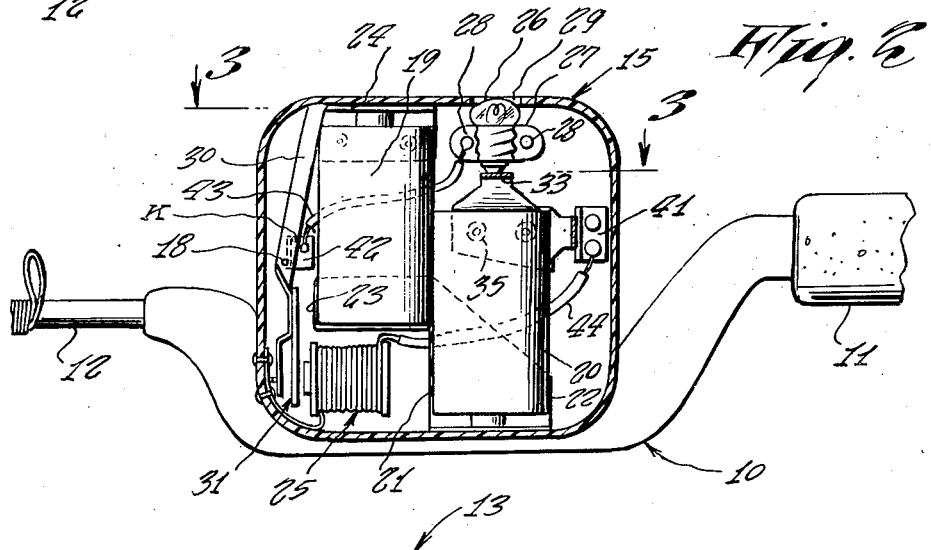
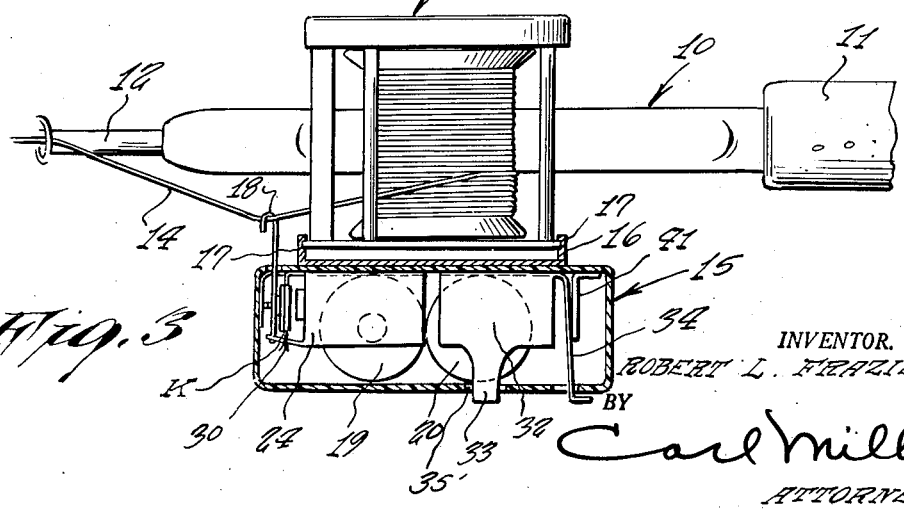
INVENTOR.
ROBERT L. FRAZIER
BY
Carl Miller
ATTORNEY

United States Patent Office 2,814,900
Patented Dec. 3, 1957

2,814,900

ELECTRIC FISHING SIGNAL DEVICE BITE BUZZ LIGHT

Robert L. Frazier, Kansas City, Mo.

Application May 22, 1953, Serial No. 356,763

1 Claim. (Cl. 43—17)

This invention relates to fishing reels and more particularly to signal devices therefor.

It is an object of the present invention to provide a signal device which readily snaps on to the side of a conventional fishing reel, the slightest pull on the fishing line being sufficient to activate the device.

It is another object of the present invention to provide an electric signal device which is handy when a person is fishing with two or three lines in the water and is most intent on watching the one in his hand, or is particularly handy in the case where the fisherman lays his rod down and goes a short distance away.

It is still another object of the present invention to provide an electric signal device of the above type which is particularly adapted for "tight line" fishing.

It is still another object of the present invention to provide a device of the above type which can be set so that it will buzz during the day or light during the night, or do both, the light guiding the fisherman to his rod if he is a short distance away from it at night.

Other objects of the present invention are to provide a signal device bearing the above objects in mind which is of simple construction, inexpensive to manufacture, has a minimum number of parts, is easy to use and efficient in operation.

For other objects and a better understanding of the invention reference may be had to the following detailed description taken in connection with the accompanying drawing, in which:

Figure 1 is a perspective view of a signal device embodying the features of the present invention and shown in operative use on a fishing reel;

Fig. 2 is a vertical sectional view taken along the line 2—2 of Fig. 1 and

Fig. 3 is a transverse sectional view taken along the line 3—3 of Fig. 2.

Referring now to the figures, 10 represents a fishing device having a handle 11 and rod 12 and provided with the usual device 13 on which is mounted the line 14, substantially as illustrated.

In the practice of the present invention, a plastic housing 15 is provided on one side with a spring member 16 of substantially U-shaped cross section (Fig. 3) and provided at its ends with grooves 17 which resiliently engage one side of the device 13 whereby to mount the casing or housing 15 in the position shown. It will be apparent that the housing may be readily snapped on and off at the convenience of the user.

Broadly, the invention comprises an electro-magnet and a flashlight bulb mounted within the housing 15 and operated by dry cell batteries contained therein.

The device is activated by a slight pull on the trigger 18 which is provided with a hooked end adapted to engage the line 14, substantially as illustrated.

A pair of dry cell batteries 19 and 20 are mounted within the housing 15 by means of a step shaped element 21 of conductive metal, substantially as shown in Fig. 2. It will be seen that the member 21 is provided with a portion 22 receiving the top or bottom of the dry cell 20 while the other end is provided with a portion 23 receiving the other end of dry cell 19, the upper end of dry cell 19 being in contact with a plate 24. An electro-magnet 25 is mounted below dry cell battery 19 adjacent battery 20, while a bulb 26 is mounted beneath the top wall of housing 15 by means of a threaded bracket 27 secured in place by screws or rivets 28. The top wall of housing 15 is provided with an opening 29 through which the bulb 26 partially extends. The plate 24 is integrally formed with a spring metal arm 30 which completes the circuit when making contact at point K (Fig. 3) upon trigger 18 being pulled, the inner end of trigger 18 being secured to the lower end of arm 30.

The electro-magnet 25 is associated with the usual buzzer assembly 31 carried at the lower end of arm 30.

The plate 32 is integrally formed with outwardly extending arms 33 and 34 and serves as a switch, being constructed of conductive metal and secured to the inner face of housing 15 by fastening means 35 (Fig. 2). The side wall of housing 15 remote from reel 13 is provided with an opening 35′ receiving the arm 33 as well as an opening 36 receiving the arm 34. The arms 33 and 34 are provided with laterally bent ends 37 and 38, respectively, by means of which the arms 33 and 34 may be adjusted within the openings 35′ and 36. The opening 35′ is provided with a lug 39 while the opening 36 is provided with a lug 40. By moving the arm 33 below the lug 39, the plate 32 will be out of contact with the bulb 26 and retained in this position by the resiliency of arm 33. Upon moving it laterally and up across the top of lug 39, the plate 32 will be in contact with the bulb 26, as will be obvious. Similarly, the arm 34 when positioned to the right of lug 40 will internally be in contact with a conductor bracket 41 (Fig. 2) whereas when the arm 36 is moved upwardly and laterally to the left side of lug 40, the contact with conductor bracket 41 will be broken. By this means the device may be set for both buzzer and light operation or for either, as will be obvious.

It will be noted that the trigger 18 is provided with a hooked portion, and the line 14 is not tied on to it.

Therefore, upon tension being applied to the line 14, the trigger 18 will be moved laterally to bring the arm 30 of resilient material into contact with contact bracket 42 (Fig. 2) which is in turn connected to conductor bracket 27 by means of wire 43. The conductor bracket 41 is connected to electro-magnet 25 by means of wire 44. Thus, when the arms 33 and 34 are both in the on position of (Fig. 1) tensioning of line 14 will move trigger 18 laterally to bring arm 30 into contact with conductor bracket 42, closing the circuit and causing light 26 to become illuminated and the buzzer assembly 31 to operate.

While various changes may be made in the detail construction, it shall be understood that such changes shall be within the spirit and scope of the present invention, as defined by the appended claim.

Having thus set forth and disclosed the nature of my invention, what is claimed is:

In an electric fishing signal housing adapted to be attached to a reel mounted upon a fishing pole, said housing enclosing a current source and an electrically actuated signal, a member effective to connect said current source with said signal projecting out of the housing transversely into substantially the normal path of the fish line extending from the reel and disposed parallel to the spindle of said reel, and a resilient gripping member having a substantially U-shape cross-sectional configuration secured upon one side of said housing and having an interior groove at its ends adapted to engage the edge of one flange of the reel proper whereby to support said housing upon said reel so as to be substantially coextensive with one side or end of said reel.

References Cited in the file of this patent

UNITED STATES PATENTS

| | | |
|---|---|---|
| 253,090 | Ohaver et al. | June 31, 1882 |
| 1,737,921 | Derr | Dec. 3, 1929 |
| 2,283,430 | Frettem | May 19, 1942 |
| 2,446,427 | Linder | Aug. 3, 1948 |
| 2,530,050 | Evans | Nov. 14, 1950 |
| 2,554,197 | Kronquest | May 22, 1951 |
| 2,619,559 | Schenkel | Nov. 25, 1952 |